Dec. 26, 1961 HIDETOSI TAKAHASI ET AL 3,015,038

SIGNAL DELAY DEVICE

Filed Nov. 20, 1956 9 Sheets-Sheet 1

Dec. 26, 1961 HIDETOSI TAKAHASI ETAL 3,015,038
SIGNAL DELAY DEVICE
Filed Nov. 20, 1956 9 Sheets-Sheet 2
FIG. 4-a
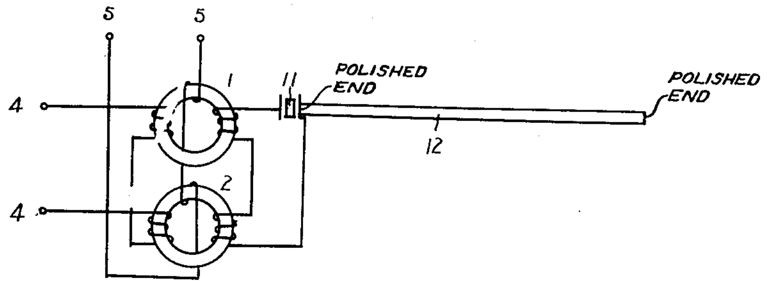
FIG. 4-b
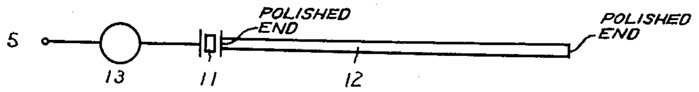
FIG. 5
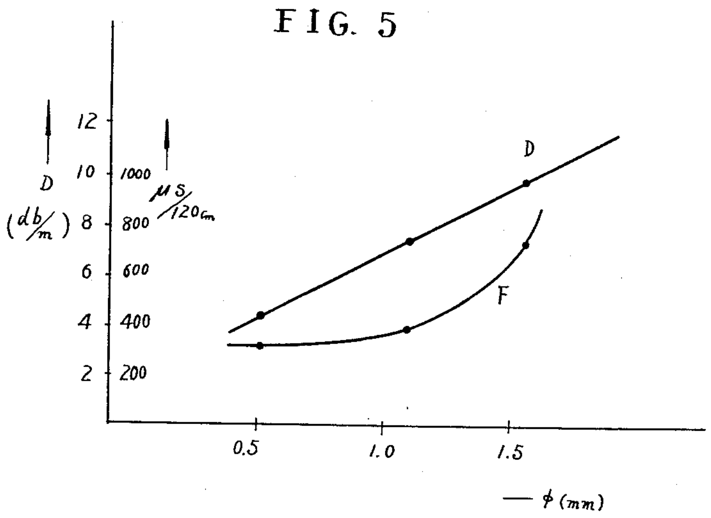

United States Patent Office 3,015,038

Patented Dec. 26, 1961

3,015,038
SIGNAL DELAY DEVICE

Hidetosi Takahasi, 870 Sendagaya 5-chome, Shibuya-ku; Eiichi Goto, 1416 Nakameguro 4-chome, Meguro-ku; Shigeharu Yamada, 1551 Kichijoji, Musashino-shi; and Zen-iti Kiyasu, 687 Sekimachi 4-chome, Nerima-ku, all of Tokyo, Japan Filed Nov. 20, 1956, Ser. No. 623,433
Claims priority, application Japan Nov. 25, 1955
21 Claims. (Cl. 307—88)

This invention relates to a device employed to impart delays to binary signals used in a parametrically excited resonator system which will be referred to hereinafter as a parametron system or device using said system to memorize said binary signals. Said parametrically excited resonator system or a parametron system is fully explained in the specification of the copending U.S. application Serial No. 508,668, filed on May 16, 1955, now Patent No. 2,948,818, entitled "Parametrically Excited Resonator" in the name of Eiichi Goto, one of the applicants of this application.

When an alternating current having a frequency twice the frequency of a resonant circuit including non-linear reactance elements, is applied to the non-linear reactances elements to excite it, an alternating oscillation current having the resonating frequency is generated. The oscillating phase of said parametrically excited resonator or a parametron (hereinafter, a parametron system is referred to only as a parametron) can assume two kinds of different phases having a difference of 180 degrees from each other. By employing said principle, a means functioning as a logical calculation and a transmission of binary phase signals can be provided by constructing a circuit having said parametron system as a circuit element. For example a high speed digital electric computer or a high speed automatic exchange device for telephone or telegraph systems can be manufactured by using a plurality of said parametrons which are passive elements. One of the important elements of such devices as stated above, is a means for imparting delay to the signals or a means to memorize and accumulate said signals. This invention provides such a delay device for signals or a memory device which memorizes signals obtained by the use of said delay device, which is employed as an element of said parametron system.

Therefore, the main object of this invention is to provide device which can be impressed with a binary phase signals generated by a parametron system without transforming it into another kind of signals.

Another object of this invention is to provide a device having a long life by using only parametrons and other passive elements.

A further object of this invention is to obtain a device which can impart a delay to and can accumulate a plurality of signals and is simple in construction and small in occupying space.

In order to accomplish the above objects, this invention employs a device in which an electro-acoustic transducer is closely coupled to an acoustic transmission medium such as a metallic wire and said device is constructed and associated with a parametron system. A series of pulses of input binary phase signals and intermittent exciting waves synchronizing with said pulse series are simultaneously impressed upon said parametron device, to transform the electrical oscillation waves controlled in their phase by said input signals into mechanical vibrations and give them to said acoustic medium or metallic wire. These mechanical vibrations are transmitted on said acoustic medium as an elastic wave, are again applied into said electric-acoustic transducer after a constant delay period, and are used to control the phase of oscillation of the parametron device.

This invention will now be described with reference to the accompanying drawings, in which;

FIG. 1 shows an embodiment of a parametrically excited resonator or a parametron to be employed in a portion of the device according to this invention;

FIGS. 2–*a* to 2–*g* show some examples of circuit notations of parametrons;

FIG. 3 shows exciting wave forms for a parametron;

FIG. 4–*a* is a circuit diagram of an embodiment of this invention, and FIG. 4–*b* is a simplified notation for said embodiment.

FIGS. 5, 6, 7 and 8 show the characteristic curves of a device according to this invention;

Figure 10:
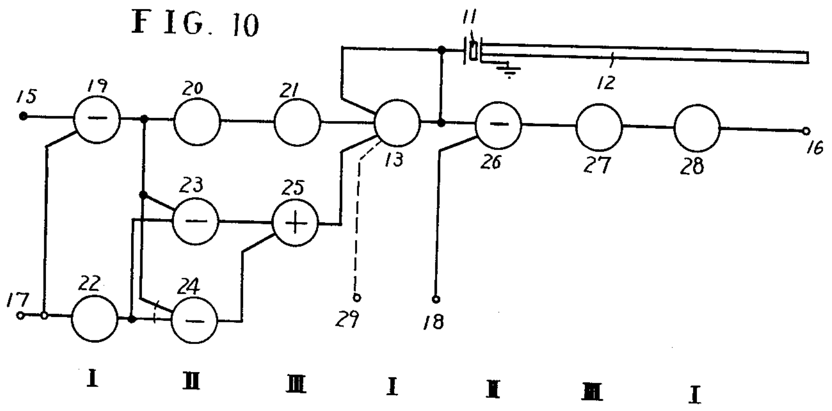
FIG. 10 shows a simplified notation of a memory device constituted by a device according including parametrons and a delay line to this invention.
Figure 11:
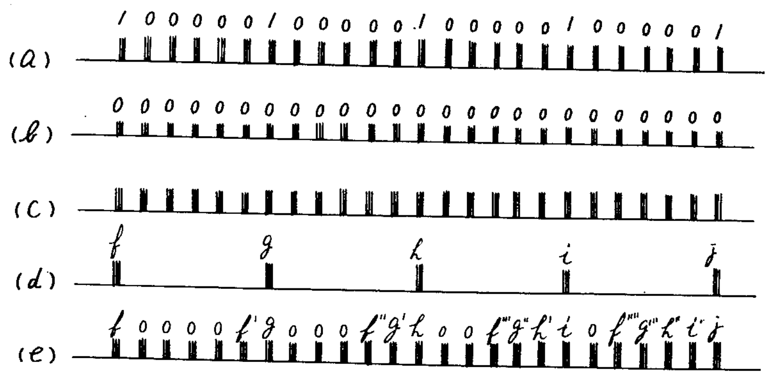
Figure 12:
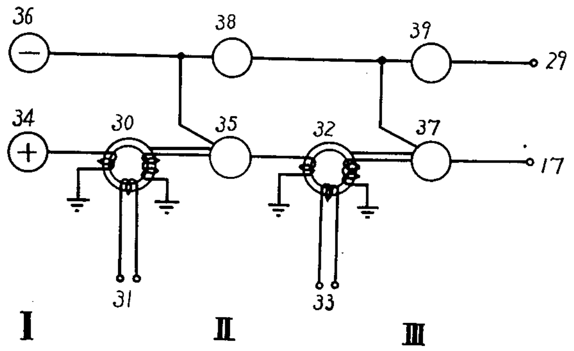
Figure 13:
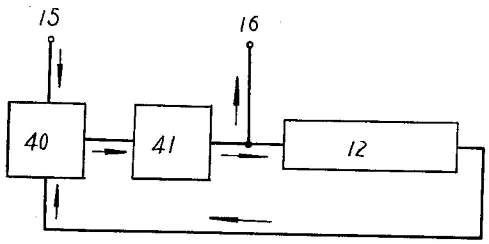
Figure 14:
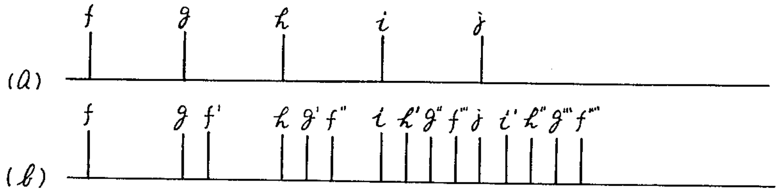
Figure 17:
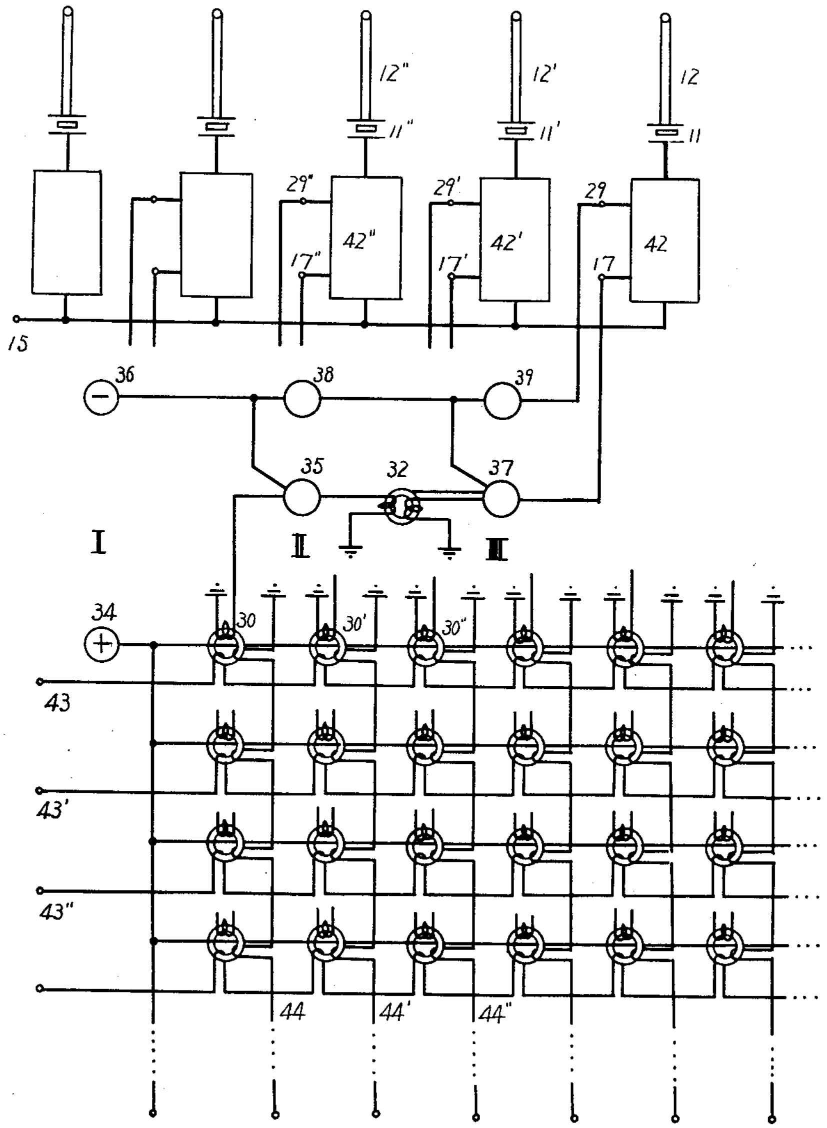
Figure 18:
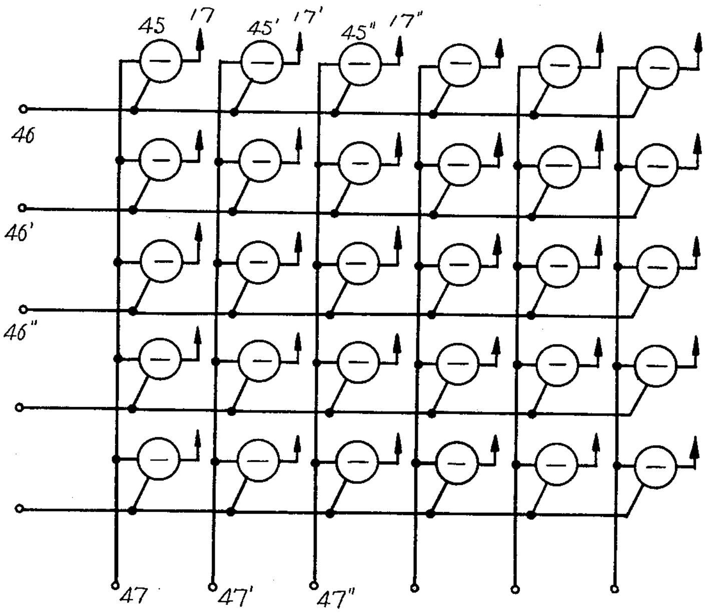
Figure 19:
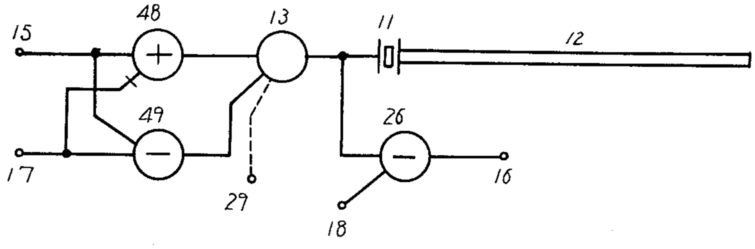
Figure 20:
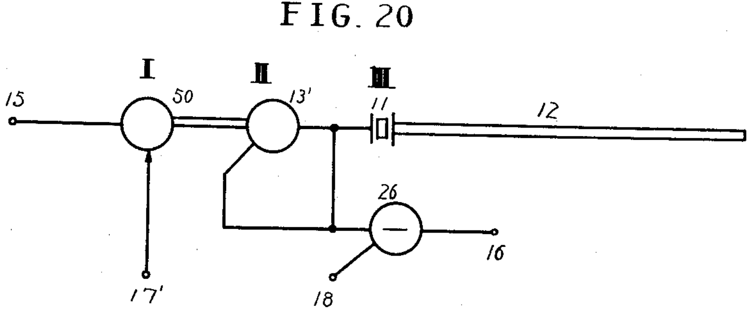
Figure 21:
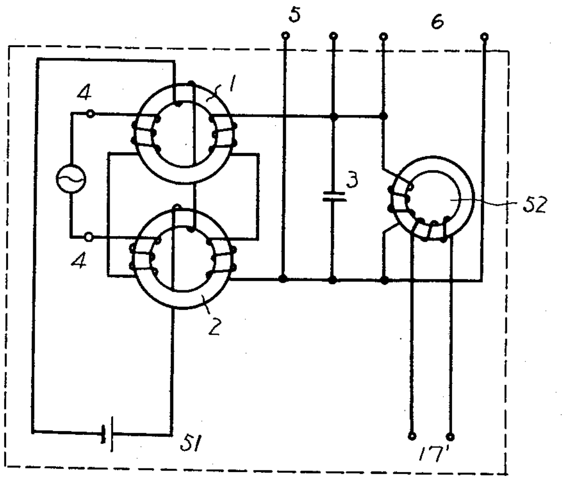
Figure 22:
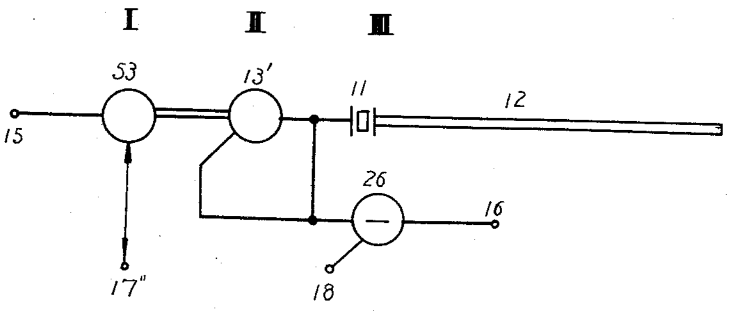

FIGS. 11–*a* to FIG. 11–*e* show wave forms for explaining the function of the device shown in FIG. 10;

FIG. 12 shows a simplified notation of a circuit to be added to the device shown in FIG. 10;

FIG. 13 shows the constructional diagram for explaining the function of the device according to this invention;

FIGS. 14–*a* and 14–*b*, 15–*a* and 15–*b*, and 16–*a* and 16–*b* show a plurality of pulse series for explaining the function of the device according to this invention;

FIG. 17 shows a connection diagram of a selecting device constructed from a plurality of memory devices employing the principle of this invention;

FIG. 18 shows another example of a selecting device employing the principle of this invention;

FIGS. 19 and 20 show other examples of memory devices employing the principle of this invention;

FIG. 21 shows a connection diagram of parametron system provided with a device for controlling the oscillation; and, FIG. 22 shows a simplified notation of another embodiment of a memory device employing the principle of this invention.

Figure 1:
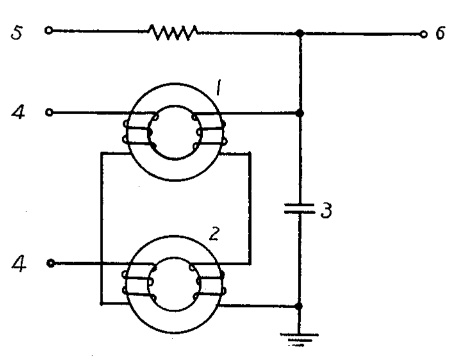

FIG. 1 shows an example of the circuit of a parametrically excited resonator or a parametron (such a resonator system is called "a parametron" hereinafter), in which non-linear reactance core elements 1 and 2 are toroidal cores made of ferromagnetic material such as ferrite and their exterior diameter is approximately 4 millimeters, their interior diameter is approximately 2 millimeters, and their thickness is approximately 1 millimeter, respectively. Primary windings and secondary windings are provided upon said magnetic cores 1 and 2, the secondary windings being connected serially, and a condenser 3 is inserted between the terminals of the secondary windings to constitute a resonant circuit having a resonant frequency $f$. Furthermore, the secondaries each link the cores in the same relation or relative sense while each primary links its respective core in a sense opposite to that of the other primary, and both ends of said primary windings are connected to exciting wave terminals 4 and 4. The resonant frequency of the secondary windings and a condenser 3 may preferably be selected for example at 1 mc. Therefore when an exciting alternating current wave having a frequency of 2 mc. is impressed upon the terminals 4 and 4, an oscillation having a frequency of 1 mc. is generated in the resonant circuit at the secondary side. As two primary windings are connected in opposite polarity against two secondary windings, and alternating current of frequency 2 mc. induced in the secondary side through the magnetic cores 1 and 2 algebraically combine with each other and are diminished.

The phase of the oscillation wave generated in the resonant circuit can take either a value of for example 0 radian or a value of $\pi$ radians which values differ by 180 degrees from each other. Therefore when a control wave having a very small amplitude of a frequency $f=1$ mc. is supplied from a control wave terminal 5 which is connected through a resistance element to the output side of the resonant circuit comprising the condenser 3, simultaneously with or a short interval of time before the application of the exciting wave from terminals 4 and 4, the oscillation phase of the resonant wave becomes 0 radian when the phase of the control wave is within the region of $$0\pm\frac{\pi}{2}\text{ radians}$$

and the oscillation phase of the resonant frequency becomes $\pi$ radians when the phase of the control wave is within the region of $$\pi\pm\frac{\pi}{2}\text{ radians}$$

This oscillation output of the resonant circuit is taken out or tapped off from the terminal 6. Ordinarily, the exciting wave applied to terminals 4 and 4 is superimposed on a direct bias current, but this direct bias current may be impressed upon another winding provided on magnetic cores 1 and 2. According to the amounts of the exciting wave and the direct bias current and the characteristics of the magnetic cores, a parametron may have two kinds of characteristics, in one of which the generation of an oscillation in the resonant circuit is accomplished by the application of the exciting current only (and in which the control wave defines the phase of the oscillation wave), and in another of said characterics, on oscillation generated in the resonant circuit is accomplished when an exciting wave is applied after impressing the control wave. The former characteristic is designated as a parametron of two value and the latter is designated as a parametron of three value in this especification, and it should be noticed that a parametron of two value is generally employed as a usual parametron in the description of this specification hereinafter, when a special notice is not accompanied to indicate otherwise.

Though the above stated parametron system employs two inductance elements of ferro-magnetic material for example, such as ferrite cores as non-linear elements of the resonance circuit, a capacitance using a material of high dielectric constant such as barium titanate or other non-linear reactance element can be used as stated in the specification of aforementioned U.S. Ser. No. 508,668.

Figure 2:
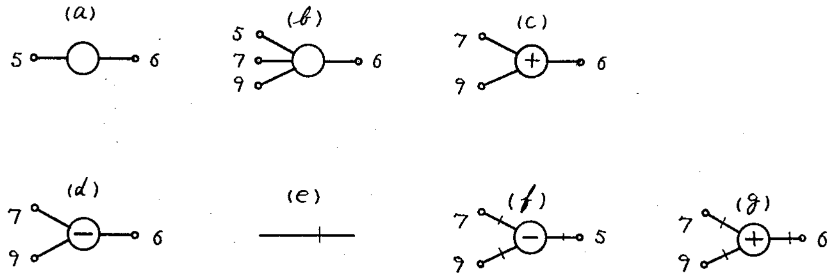

FIG. 2–*a* is a schematic notation of an element of parametron element, which is represented by a circle with an input terminal 5 for the control wave on the left side of it, and with an output terminal 6 on the right side of it. These terminals correspond to the terminals with the same numerals as used in FIG. 1, and the exciting terminals 4 and 4 in FIG. 1 are eliminated from the notation in FIG. 2–*a*. When a plurality (in odd number) of control terminals are provided on a parametron, and control signal waves having approximately the same amplitudes of either 0 phase or $\pi$ phase are impressed on them, the generated phase of said parametron is determined by the majority of the phases of impressed waves.

FIG. 2–*b* shows an example of a parametron having three control terminals 5, 7 and 9. When a parametron provided with three input terminals 5, 7 and 9 is impressed constantly with a control wave of $\pi$ phase to the terminal 5 and also with control waves which may have a phase of 0 or $\pi$ according to the type of information signals applied to the terminals 7 and 9, an oscillation having $\pi$ phase can be generated in said parametron in case when one of the impressed information signals has at least a $\pi$ phase. That is, this parametron constitutes a logical sum circuit or a logical "OR" circuit for a signal having $\pi$ phase. This logical sum circuit may be represented by a circuit notation as shown in FIG. 2–*c*, in which a control wave terminal 5 for the constant input is eliminated and a notation of + is inserted within a small circle. When one of the three input terminals is constantly impressed with a control wave having 0 phase and other two terminals 7 and 9 are impressed with control waves of either 0 phase or $\pi$ phase according to the information signals, the parametron may generate an oscillation having $\pi$ phase when the phases of the control waves according to the information signals are both $\pi$. That is to say, the circuit stated above is a logical product circuit or a logical "AND" circuit, and is expressed by the notation shown in FIG. 2–*d*. Furthermore, when a control wave or a generated oscillation wave is applied to a transformer and therefore the phase of said wave is inverted, a signal of 0 phase becomes a signal of $\pi$ phase and a signal of $\pi$ phase becomes a signal of 0 phase. This phase inverting circuit is a logical negative circuit or a logical "NOT" circuit and is expressed by a notation of FIG. 2–*e*. As is understood from the above stated explanations, the circuit shown in FIG. 2–*c* has the same function as the circuit shown in FIG. 2–*f*, and the circuit of FIG. 2–*d* has the same function as the circuit shown in FIG. 2–*g*, that is to say, these circuits are equivalent, and parametrons described hereinunder can be modified in various ways by these equivalent circuits.

Figure 3:
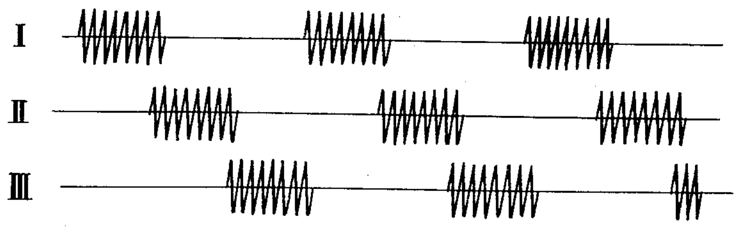

A parametron system in general is constituted by the serial combination of the plurality of parametrons having the notations described above, and the parametrons in various stages are excited by the exciting waves I, II, and III which are displaced in time while being superposed in time only a little as shown in FIG. 3 and are generated intermittently in the order I→II→III→I as shown in said FIG. 3. When an exciting wave I is impressed on the elements in the first stage, respective elements in the second, third, fourth, . . . stages are impressed by the exciting waves II, III, I, II, . . . in turn. Therefore, for example, at the time when an exciting wave is applied to a resulting element on the second stage and an oscillation is generated, the oscillation output from the element at the first stage is also impressed upon said element in the second stage. Therefore the oscillation phase of the second stage element is controlled by the phase of the oscillation wave of the first stage element. Similarly, the phase of the oscillation wave of the third stage element is controlled by the output of the second stage element, and the phase of the oscillation of the fourth stage element is controlled by the output of the third stage element and so on. Thus the signal is transmitted in a parametron system composed of a plurality of parametrons, and the notations, I, II and III described in the lower portions of the elements in the figures in the accompanying drawings show the above stated exciting waves.

FIG. 4–*a* shows a simplified example according to this invention in which a parametron heretofore described is constituted by magnetic cores 1 and 2, windings provided on said magnetic cores and a condenser 11 made of a high dielectric material such as barium titanate or the like. Between the terminals 4 and 4 there is impressed with an exciting wave and between the terminals 5 and 5 there is impressed with a regulating wave or the control wave. Said terminals 5 and 5 can preferably be coupled directly to the resonating circuit as shown in FIG. 1, and as the condenser 11 is a piezo electric element, a mechanical vibration may be generated when an alternating voltage is applied between the electrodes of said condenser. As the oscillation frequency of the parametron is selected at a high frequency value such as 1 mega-cycle, this mechanical vibration is commonly a super sonic wave. The device shown in FIG. 4–*a* is a device in which an element 11 in the resonance circuit is simultaneously used as an electro-acoustical transducer, and one side of the piezo-electric element is coupled to a metallic wire 12 which is used simultaneously as one electrode of the condenser 11. Therefore, when the parametron in this figure oscillates, the generated oscillation voltage is impressed upon the condenser 11, and the supersonic oscillation generated by it is transmitted on the metallic wire 12. FIG. 4–*b* shows the device of FIG. 4–*a* in which the parametron portion of it is expressed by the notations stated hereinbefore in FIG. 2. When the parametron 13 generates an oscillation wave, a supersonic wave is generated at one side of metallic wire 12, and this supersonic vibration is transmitted by the metallic wire as a longitudinal wave.

FIG. 5 shows a graph having two plots representing practically measured data of attenuation D in decibels and a delay time F in micro-seconds when the above stated supersonic wave is transmitted along the metallic wire, and said wire is made of a copper alloy comprising nickel 40% and copper 60%, heat treated at 400 degrees C. The oscillating frequency $\phi$ of the parametron at this measurement is 1.35 mc., and the abscissa of these plots on the graph are given as the diameter of this wire in millimeters. Said attenuation D corresponds to a value per one meter length and said delay time corresponds to a value per 120 centimeters length. It can be understood from the graphs shown in FIG. 5 that the attenuation is smaller when the diameter of said wire is finer or decreases as the diameter of the wire decreases, and the delay time has a very small variation when the diameter of the wire is less than 1 millimeter. Therefore, when a metallic wire having smaller diameter is used, the delay time can be made to have an increased value with a decreased attenuation. Also, as the vibration mode can be maintained constant during transmission by making the diameter of said wire smaller, the generation of a spurious wave can be prevented. But as it is very difficult to employ an extremely fine wire due to the difficulty of working, coupling and supporting a metallic wire, we used a wire made of said alloy having a diameter of 0.5 millimeter. In heat treating said metallic wire, the size of the molecular particles of said wire increases rapidly when the temperature of heat treatment passes over a certain value, increasing the attenuation of supersonic vibration, and the temperature of the heat treatment at which the size of the molecular particles begins to increase, is varied according to the components of said alloy.

Figure 6:
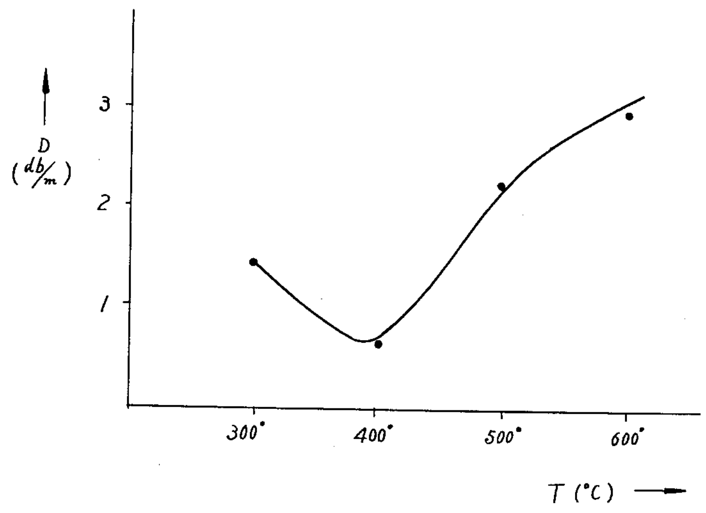
Figure 7:
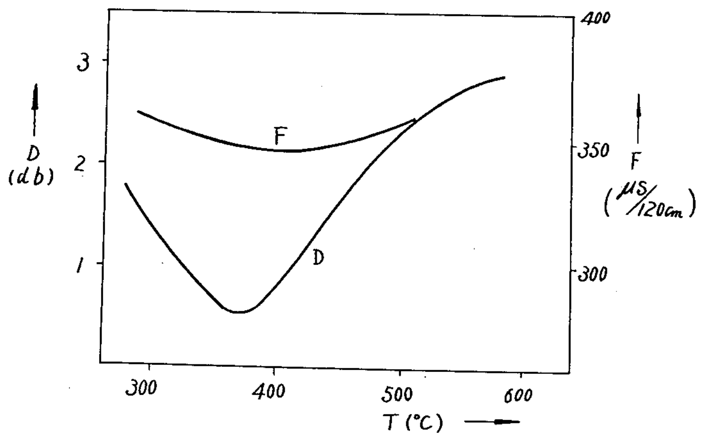
Figure 8:
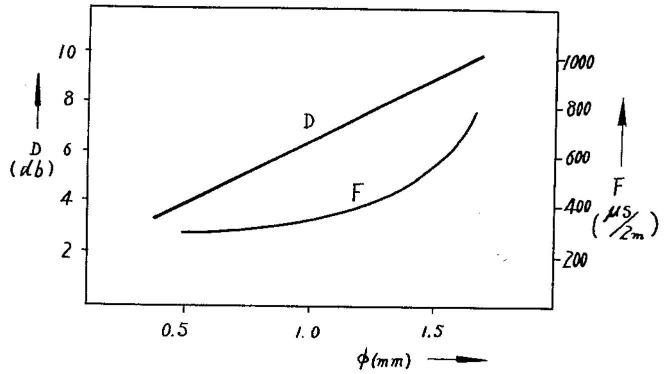

FIG. 6 is a graph representing the practical measured attenuation of a metallic wire made of a copper alloy comprising nickel 40% and copper 60% in a manner similar to FIG. 5, the abscissa shows the heat treating temperature in degrees C., the ordinate shows the attenuation D in decibels per one meter length. The frequency used is 1.35 mc. As clearly shown in this figure, the attenuation increased rapidly when the heat treating temperature passes over 500 degrees C., and the attenuation is smallest or minimum when it is heat treated at a temperature between 350 degrees C. to 400 degrees C. FIG. 7 shows an example of graphical representations of the characteristics of a brass wire having a diameter of 1 millimeter, the ordinate representing attenuation in decibels per 1 meter length and the delay time F in micro-seconds per 120 centimeters length, and the abscissa representing the heat treating temperature T in degrees C. FIG. 8 shows graphical representations in which the abscissa represents the diameter in millimeters, and the abscissa represents the attenuation D in decibels per 1 meter length and the transmission period of time F in micro-seconds.

As seen in the device of FIG. 4–*b*, the supersonic wave transmitted into the metallic wire 12 travels with a constant speed determined by the material constituting the wire, the heat treating condition and the diameter of said wire, the wave being reflected at the end of the wire and is again applied to the condenser 11 or the electro-acoustic transducer of the parametron to generate an oscillation in it. Therefore an alternating voltage corresponding to said oscillation is generated between the electrodes of said condenser 11. In this state of the parametron, when an exciting wave is applied to the exciting terminals 4 and 4 of FIG. 4–*a* (which are eliminated in the notation of FIG. 4–*b*) to generate an oscillation in the parametron, the phase of the oscillation generated in said parametron is controlled by the alternating voltage generated by said condenser 11. Then, assuming the velocity of transmission of the super-sonic vibration on the metallic wire 12 to be V, and the frequency of said generated vibration to be $f$, the phase of the initial oscillation of the parametron controlled by the controlling wave terminals 5 and 5 can be made to coincide with the phase of the later oscillation controlled by the supersonic vibration generated after the transmission on the metallic wire 12 by selecting the length $l$ of the metallic wire to be an integral multiple of $v/2f$. As the supersonic vibration necessitates a time $$t=\frac{2l}{v}$$

to go and return along said metallic wire 12, a time delay $t$ can be given to binary phase signals generated by a parametron according to the device as seen in FIG. 4–*a* or FIG. 4–*b*.

Though a high dielectric condenser or a piezo-electric element is used as an electro-acoustic transducer and it is also used as an element of the resonant circuit in the examples shown above, a separate electro-acoustic transducer different from the condenser element can be employed, or a means utilizing magneto-strictive material may be employed. In a coupling arrangement using a piezo-electric element, a disc of barium titanate and having a diameter of 1 millimeter or 2 millimeters is fixed to an end of a brass wire whose diameter is 0.5 millimeter by soldering or other suitable fixing means, and another surface of said disc is provided with a metallic film of soldering material or silver by glazing or the like, making said metallic film and said metallic wire as the electrode of a condenser. Furthermore, by using barium titanate baked in the form of cylinder and penetrating the metallic wire through said cylinder, an electro-acoustic transducer may be provided on a suitable position intermediate of said metallic wire. Therefore, by setting a plurality of electro-acoustic transducers upon a single metallic wire and coupling said transducers to a plurality of parametrons respectively, a plurality of outputs provided with suitable delay time respectively can be obtained by a single delay device. In this case, the reflections of supersonic waves can be easily absorbed by polishing both ends of said metallic wire into exponential or other shapes to prevent the generation of erroneous signals, and the length between the input and output transducers can be readily and minutely regulated.

Though a delay device can be obtained by one metallic wire and two parametrons using two disc piezo-electric elements coupled to both ends of a metallic wire as stated above, and as a metallic wire can not easily be cut off, a minute adjustment between the phase relations of input and output waves and the delay time can not be obtained readily by varying the length of said metallic wire.

Figure 9:
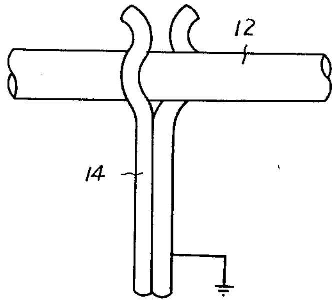
FIG. 9 shows an example of a supporting means in this invention.

In a parametron system used in an electric computer or in a translator of telephone system, it is necessary to use delay devices of large capacity or memory devices in general as explained hereinafter. But as the device according to this invention mainly relates to the provision of a metallic wire having a length of the order of several decimeters, a delay device or a memory device having a large capacity can be constituted by arranging a hundred or more of metallic wires in parallel. By holding said metallic wire by a clip 14 slidably at a plurality of positions along said metallic wire as shown in FIG. 9, axial slipping contacts can be obtained between said metallic wire and said clip. Then longitudinal waves upon said metallic wire can be transmitted without causing attenuation or generating irregularities in the vibration modes by said clip. Furthermore, as the transmission velocity of the supersonic waves in said metallic wire is somewhat variable according to the ambient temperature, said velocity can not be affected by the variation of ambient temperature by putting the groups of delay devices within a vessel having a constant temperature, whereby devices having a constant delay period of time can be manufactured.

The explanations stated heretofore relate to the basic principles of this invention and the mechanism to function it, and another explanation relating to a further embodiment will be given hereinafter.

FIG. 10 shows a systematic diagram of a device for making memories of binary phase signals by employing a delay device constituted by a parametron 13 of two values and a metallic wire 12. A binary phase signal to be memorized is impressed upon an input terminal 15, and the output signal read out is given to a suitable parametron system from an output 16, if necessary. The parametrons connected to the input terminal 15 and the output terminal 16 are also impressed with exciting waves I, II and III which are respectively applied to the respective parametrons shown in FIG. 10, the frequencies of these exciting waves being selected, for example as 2 mc./s. Therefore, a respective parametron generates a signal having a frequency at 1 mc. and a phase which corresponds either to 0 or $\pi$. In the notations described below, a signal having 0 phase is expressed by "0" and a signal having $\pi$ phase is expressed by "1."

At first, when information signals are written into said device, a pulse train comprising of signal "1" synchronized with an exciting wave III is impressed upon the terminal 17, and a train comprising of signal "0" synchronized with an exciting wave I is impressed upon the terminal 18. Though a parametron generating a constant phase oscillation is used usually as the source of those signals, continuous waves having either $\pi$ phase or 0 phase obtained from some suitable oscillators may also be used to generate said train of pulses. Information signals of "1" or "0" to be memorized are impressed on the input terminal 15 in turn, and as a parametron 19 constitutes an "AND" circuit and a signal of "1" is constantly applied to the terminal 17, the output oscillation signals of the parametron agree with the information signals applied upon said terminal 15. Therefore, output signals of parametrons 20 and 21 also agree with the signal applied on the input terminal 15 and, a parametron 13 coupled to an electro-acoustic transducer 11 fixed to one side of a metallic wire 12 and has three input terminals, to one of which an output from a parametron 21 is applied. A parametron 22 to which a constant signal "1" is constantly applied, sends out the signal "1" constantly, and a parametron 23 constituting an "AND" circuit is supplied with the signal "1," whereas to another "AND" circuit parametron 24, a negative signal "0" transformed from said signal "1" is applied. A parametron 23 is further supplied with an information signal on the terminal 15 as another input signal, and then the output from the parametron 23 has either signal "1" or signal "0" corresponding to the information signal on the input terminal 15. As a parametron 24 constitutes an "AND" circuit and it is always supplied with signal "0" from a parametron 22, the output from said parametron 24 is always a signal "0." But as a parametron 25 constitutes an "OR" circuit and signal "0" is always supplied to one input terminal of the parametron 25, the output signal of said parametron 25 always agrees with the output signal of parametron 23, that is, to the information signal applied to the input terminal 15. Said output signal of the parametron 25 is supplied as one input to one of the input terminals of the parametron 13.

By the functions stated above, the input information signal is applied to two input terminals of a parametron 13. Therefore, though one of the input terminals of the parametron 13 is connected to the electro-acoustic transducer, 11, the parametron 13 can generate an oscillation having a similar phase as the input information signal as long as the output signal from said transducer or a piezo electric element 11 is not excessively large, and said generated oscillation output is supplied to a parametron 26. But as said parametron 26 constitutes an "AND" circuit and is supplied with a signal "0" from the terminal as one input signal, said parametron always generates a signal "0" notwithstanding the oscillation phase of the parametron 13. This generated signal is transmitted to parametrons 27 and 28 without variation, and appears at the output terminal 16. Therefore a signal "0" is transmitted to said output terminal 16 as long as a signal "0" is supplied to an input terminal 18. On the other hand, an electro-acoustic transducer 11 or a piezo-electric element is supplied with an oscillation voltage of a parametron 13 and generates a certain mechanical vibration, which is transmitted toward the right hand end of the metallic wire 12 along said wire. This vibration is reflected at the right hand end of said wire 12 and is again fed back to an electrode of said element after a time lapse of $$\frac{2e}{v}$$

seconds. When the period of excitation of parametrons is $e$ seconds, then $n$ information signals are transmitted along said metallic wire 12, and said number $n$ is defined by $$n=\frac{2l}{ve}$$

Then the signal upon the terminal 17 is transformed into signal "0," and whereby an "AND" circuit element 19 can generate constantly a signal "0" notwithstanding the application of a signal on the input terminal 15 or notwithstanding the kind of signal upon it when a signal is applied to said terminal 15. This signal "0" is applied to a parametron 13 through two parametrons 20 and 21. On the other hand, a parametron 22 also generates a signal "0" and acts to maintain the output signal of an "AND" circuit element 23 to be "0." As an "AND" circuit element 24 is supplied with negative signals "1" and "1" of the output signals "0" and "0" of parametrons 19 and 22, said element 24 generates a signal "1," so that a parametron 25 constituting an "OR" circuit generates constantly a signal "1." Therefore the parametron 13 is supplied with a signal "0" from the parametron 21 and a signal "1" from the parametron 25, but as these control signals have the same amplitudes and opposite phases, they cancel each other and are eliminated. Therefore the parametron 13 is only supplied with an alternating voltage generated by the element 11 due to a signal wave on the metallic wire 12. As the alternating voltage has, of course, a frequency similar to the oscillation frequency of the parametrons, and also a phase agreeing with the phase of an oscillation generated by the parametron 13 previously, said parametron 13 again oscillates with a phase similar to the phase when it oscillates corresponding to the input signal on the input terminal 15 previously. That is to say, a signal wave on the metallic wire 12 is amplified, and is again transmitted along the metallic wire toward the right hand end of said wire. Therefore each acoustic wave of $n$ signals transmitted along the metallic wire 12 are reflected at the right hand end of said wire in turn, again fed back to the position of an element 11, then amplified regeneratively by the parametron 13, and proceed again towards the right hand end of the metallic wire. Therefore, $n$ signals applied to the metallic wire 12 are not attenuated and diminished, and go and return on said metallic wire maintaining the phase when applied intially. Though if the supersonic vibrations of the metallic wire have a few distortions in their phases during said transmission, the parametron 13 will generate accurately with a phase of "0" or "π." Therefore, the device according to this invention has an automatic self compensating function for the phases.

It is obviously seen from the foregoing explanations that the information signals applied to the input terminal 15 were written into the metallic wire 12 when a signal "0" is applied to the terminal 18 and a signal "1" is applied to the terminal 17, and that the signals written into said metallic wire can be memorized and maintained when a signal "0" is applied to the terminal 17. The period of the information signals in these cases, should be equal to the period of the exciting wave, and the number of the signals written should be $n$ defined above.

In the next place, the read out function for the signals memorized by the supersonic wave delay line 12 and a parametron 13 is to be described. In the case of reading out function, a signal "1" is applied to a terminal 18. Then, an oscillating output of a parametron 13 and a signal "1" supplied to the terminal 18 are applied together to a parametron 26, and the oscillating output of said parametron 26 constituting an "AND" circuit is always in agreement with the oscillating output signal of a parametron 13. The output of the parametron 26 is applied to an output terminal 16 through parametrons 27 and 28 for delaying signals and are to be provided if necessary. Therefore the signals repeatedly go and return along said metallic wire and after being memorized on it are read out successively from the output terminal 16. After the accomplishment of a necessary read out function, the signal applied to the switching terminal 18 for read out is changed into "0," the output signal from the parametron 26 is changed into "0" and the signal from the output terminal 16 becomes also "0." Furthermore the memorized signals on the metallic wire 12 are not diminished by said read out and are maintained. According to the means for read out stated above, a signal "0" is constantly sent out from the output terminal 16 when the read out means is not used. But when the read out means is not used, the oscillation which appeared on the output terminal 16 can be stopped by impressing only the output signal of a parametron 13 upon the parametron 26, and either by varying the load of an output end parametron 28, or by varying the direct bias current on the magnetic cores. Furthermore when a directive coupling is used between parametrons 13 and 26 in order not to add the output of a parametron 26 to the input of a parametron 13, a more accurate and safe function is obtained.

Though these explanations relate to the case when the period of the signal applied to the input terminal 15 is similar with the period of the exciting wave, a satisfactory function can be obtained when the period of the signal has a value of an integral multiple of the period of the exciting wave. These functions will be explained with reference to the accompanying drawings from FIG. 11–*a* to FIG. 11–*e*, in which FIG. 11–*c* shows the exciting wave and FIG. 11–*d* shows the input information signal pulses. In these cases when the period of the input signal is an integral multiple of the exciting wave, the device shown in FIG. 10 is provided with a further input terminal 29 (shown in dotted line) to the parametron 13, and a device of the type shown in FIG. 12 is added to the terminals 17 and 29 as shown in FIG. 10. In these conditions, when the information signal is to be written in, a D.C. control current terminal 31 of a coupling transformer 30 in the device shown in FIG. 12 is made open, and an intermittent direct current is applied to a coupling transformer 32 by a control current terminal 33, in order to cut off the former D.C. control current when a signal is applied to the input terminal. A parametron 34 acts to generate constantly the signal "1" by impressing a constant input signal "1," to it, and said generated output signal "1" is supplied to a parametron 35 through the coupling transformer 30. Furthermore the coupling intensity of a parametron and the transformer is assumed to be strengthened as shown in the figure by double lines in order to supply a signal of double the amplitude, for example, of the amplitude of a standard control signal to a parametron 35 or 37. Then, a parametron 35 can generate the signal "1" notwithstanding the phase of the signal sent from the parametron 36. This constant output signal "1" is applied as stated above to the parametron 37 with a strength for example of twice of the standard strength when a D.C. current is not applied to the terminal 33, or when an information input signal is applied to the input terminal 15. Therefore the parametron 37 generates a signal "1" notwithstanding the output of a signal from a parametron 38, and this signal "1" is applied to the device shown in FIG. 10 when a D.C. control signal is applied to the terminal 33, the magnetic core of the coupling transformer is saturated, and as the coupling between the parametrons 35 and 37 is interrupted, a parametron 37 is supplied with the output from a parametron 38. As the parametron 36 is supplied with a constant input signal "0," said parametron 36 generates a signal "0" constantly, this signal "0" is applied to a parametron 37 without variation through a parametron 38, and this parametron 37 transmits a signal "0." Therefore the signal applied to the terminal 17 becomes either a signal "1" when an information signal is applied to the input terminal or a signal "0" when the information signal is not applied, as shown in FIG. 11–*a*. And a parametron 36 constantly generates a signal "0," said signal "0" is supplied to the terminal 29 through parametrons 38 and 39. But the strength of said signal "0" is weaker than the standard strength, that is to be a half of said strength, for example. FIG. 11–*b* shows a weak signal applied to the terminal 29.

Therefore, when a signal is applied to the information signal input terminal 15, the signal on the terminal 17 become "1," and a parametron 13 is supplied with signals of twice strength of the standard value from the parametrons 21 and 25, the signals being written in notwithstanding the existence of a weaker signal from a terminal 29. But when a signal is not applied to the terminal 15, the signal on terminal 17 becomes "0," and as the parametron 13 is supplied with opposite signals from parametrons 21 and 25, these opposite signals act to cancel each other, the parametron 13 being controlled by the weaker signal from the terminal 29. In this condition, the delay line 12 acts at first to write in a signal $f$ shown in FIG. 11–*d*, and this is shown in FIG. 11–*e* by the same notation $f$. In the next place, as there is not a signal supplied from the delay line 12, the parametron 13 is controlled by the signal on the terminal 29, and generates signals "0" repeatedly. Therefore a plurality of signals "0" are written in on the delay line 12 after the signal $f$ as shown in FIG. 11–*e*.

Let us assume that the coupling strength of the parametron has a standard value when the signal $f$ is applied to parametron 13 again after said signal $f$ has gone and returned on the delay line 12, the oscillating phase of the parametron 13 is controlled by a signal from the delay line notwithstanding the weaker signal on the terminal 29, regenerating and amplifying a signal $f'$ as shown in FIG. 11–*e*. In the next place, as an information signal $g$ is applied to the terminal 15, this input signal $g$ is written in the delay line as shown in FIG. 11–*e*. Then the signals $f$, $g$, $h$, $i$, and $j$ are written into the delay line 12 in turn as shown by same notations in FIG. 11–*e*, and said signals go and return on said line repeatedly by and regeneratively as shown by notations $f'$, $g'$, . . .; $f''$, $g''$, . . .; and $f'''$, $g'''$ . . .. By such methods, when the delay line 12 is filled with signals, a D.C. control current is impressed upon said terminal 31 of FIG. 12 to act as a memory circuit in order to memorize said signals. Then the coupling between parametrons 34 and 35 is interrupted and the parametron 35 is controlled only by the signal from the parametron 36 to generate signal "0" constantly.

When the terminal 33 is opened in order to couple parametrons 35 and 37, a signal "0" is applied to the terminal 17. Therefore the signals upon the delay line can be memorized and maintained. FIG. 13 is a block diagram representing the device of FIG. 10. In this figure information signals having equal spacings are applied on the input terminal 15, and these signals are applied to a regenerative amplifier 41 through a hybrid transformer 40. Output signals amplified by an amplifier 41 are impressed upon the delay line 12 to give delays of time $t$ and said signals are again applied to the amplifier 41 through the hybrid transformer 40. Therefore signals delayed by said delay line 12, attenuated and deformed somewhat, are regeneratively amplified by the amplifier 41 and compensated in their phases, and are applied to the delay line 12 again. Then the first signal $f$ shown in FIG. 11–$d$ is delayed for a time $t$, being applied to the amplifier 41 at the time of signal $f'$ of FIG. 11–$e$, and the second input signal $g$ is applied to it at the following exciting period. Then, after that time, the first signal and second signal circulate between a hybrid transformer 40, an amplifier 41 and a delay line 12 with a constant relation in time. Signals $f'$, $g$, $f''$, $g'$, $f'''$, $g''$, in FIG. 11–$e$ represent these conditions. After the second signal is applied to the amplifier secondly, a third signal $h$ is applied to the terminal 15. Then, after the time when the first signal is applied to the amplifier at the fourth time, signals of the second, third and more over are continued, as shown in FIG. 11–$e$ by $f''''$, $g'''$, $h''$, $i'$ and $j$. Therefore a series of signals having larger intervals as shown in FIG. 11–$d$ are arranged on the delay line with compressed intervals. This series of signals can be memorized as they stand as explained hereinbefore, but they may be taken out in order to impress upon a following device when the compression of the intervals is only required. In this case, the delay time $t$ is generally expressed by the following equation.

$$t = n\text{N} + m\text{M} = \text{PT}$$

in which, N is the interval of imput signals in time, M is the interval of output signals in time, T is the exciting period, $m$, $n$ are plus or minus integers and P is a plus integer. Examples shown in FIG. 11 have the relation of $$n=1,\ m=-1$$

and $$p \equiv /\text{mod}\ \frac{N}{T}$$

and the input signals are compressed in their spacings without varying the order of the signals.

Figure 15:
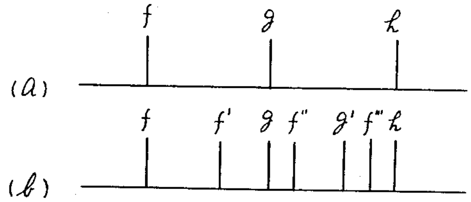
Figure 16:
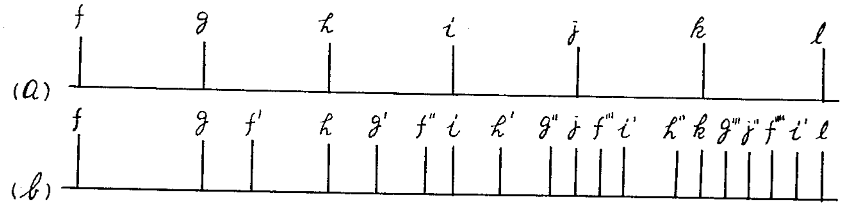

When $n=m-1$, the input signal series shown in FIG. 14–$a$ is arranged in a compressed inverse order as shown in FIG. 14–$b$, and when $n=1$ and $m=-2$, the input signal series and the signal series on the metallic wire 12 are shown in FIGS. 15–$a$ and 15–$b$. FIGS. 16–$a$ and 16–$b$ show the case when $n=m=2$, and the order of the signals are inversed. When the compressed and inversed signals are taken out at a time interval M, an output signal series having the same order as arranged on the metallic wire 12 can be obtained, and when said signals are taken out at a time interval N, a signal series similar to the order of the original signal series can be obtained. When the supersonic delay devices according to this invention are employed as a memory device in an electronic computor, electronic telephone exchange system or the like, a group of delay lines in the order of hundreds or thousands are used, and necessary delay lines selected from said group are used to write the signals into them and suitable lines are selected to read out the memorized signals in them, when the information signals are to be written in or read out.

FIG. 17 shows a connection diagram of one embodiment according to this invention in which a plurality of unit memory devices, employing the devices shown in FIGS. 10 and 12, are provided, and a suitable unit is selected to write the signals into it. In FIG. 17, devices 42, 42', 42'', . . . are the parametron systems shown in FIG. 10, and each respective one of these parametron systems is provided with a supersonic delay line 12, 12', 12'', . . . and an electro-acoustic transducer 11, 11', 11'', . . . . Each of the electro-acoustic transducers 11, 11', 11'', . . . can be simultaneously used with the resonant circuit element of each parametron 13, as stated hereinbefore. Switching devices 42, 42', and 42'' are each provided with terminals 17, 17', and 17'' and 29, 29', and 29'', respectively, which each are connected to a device of the type shown in FIG. 12. The coupling transformers 30, 30', 30'', etc. attached to respective memory devices are arranged in a matrix form as shown in this figure, and are supplied with an input of signal "1" from a common constant signal parametron 34. The magnetic cores of the parametrons which are arranged in a matrix form are respectively coupled by conductors 43, 43', 43'', etc. in several lines and also are coupled by conductors 44, 44', 44'', etc. in several columns, and these conductors 43, 43', 43'', etc. and 44, 44', 44'', etc. are constantly supplied with currents to fully saturate said magnetic cores. Therefore, as all of the magnetic cores are fully saturated in these conditions, a signal "1" generated by the parametron is not supplied to any of the terminals 17, 17', 17'', etc. But when an information signal on input terminal 15 is to be written in by applying a writing in signal upon the switching device 42, the currents on the wire 43 and 44 are cut out. Then the magnetic core of a transformer 30 becomes unsaturated, and the output signal "1" of a parametron 34 is applied to a terminal 17. Therefore, the information signal on the input terminal 15 can be written into the delay line 12 through the switching device 42 as stated previously. But the magnetic cores of the other transformers 30', 30'', etc. receive D.C. excitation by at least one of the conductors 43', 43'', etc. and 44', 44'', etc. applied with D.C. currents. Then the output signal "0" of the parametron is supplied to the terminals 17', 17'', etc. In FIG. 17, though the signal read out terminal 18 and the selecting device connected to said terminal are eliminated, a device operating on the same principle as the above stated selecting device can be used as a read out selecting device.

In the above stated example, a direct current is used as a selecting signal, it is often recognized to be more advantageous to use a binary phase signal for direct control of selection in a parametron system, and FIG. 18 shows a selecting device in such a case. In FIG. 18, parametrons each constituting an "AND" circuit 45, 45', 45'', etc. are arranged in a matrix form, and the output terminal of this device is connected to a write in terminal 17. And signals applied to the selecting signal terminals 46, 46', 46'', etc. and 47, 47', 47'', etc. are supplied to the parametrons on respective lines and respective columns. In such a device, when a signal "1" is applied to terminals 46 and 47, and signal "0" is applied to the remaining terminals 46', 46'', etc. and 47', 47'', etc., a parametron 45 can only generate a signal "1." Therefore, the use of a D.C. control signal is not necessitated, and an output of a parametron can be used to control selection directly.

FIG. 19 shows an example of a simplified circuit corresponding to the device of FIG. 10. When a write in signal "1" is applied to the terminal 17, parametrons 48 and 49 can generate together the same signal as the information signal to be supplied to the terminal 15, to apply it to a parametron 13 in order to write said information signal into said device. When a signal "0" is applied to the terminal 17, a parametron 48 produces signal "1" constantly and a parametron 49 produces a signal "0," so that these signals cancelled each other, and the signal is maintained as in the device of FIG. 10.

Parametrons in the examples described above are made to generate oscillations when exciting waves only are applied, and A.C. oscillations generated intermittently as shown in FIG. 3 is used as the constant exciting waves, but when a parametron of three value stated previously, i.e. a parametron which oscillates only when an exciting current and input signal are both applied, is employed, a simple device can be obtained. FIG. 20 shows an example of a memory device in which a parametron 13' coupling the delay line 12 and electroacoustic transducer 11 is a parametron of three value, and a parametron 50 becomes a condition of three value oscillation by applying a signal to a terminal 17', in case of writing the signal into said delay line, and also acts to prevent the generation of oscillations when the signal is to be read out or to be maintained. FIG. 21 is an embodiment of said circuit in which magnetic cores 1 and 2, windings provided on said magnetic cores and a condenser 3 constitute a parametron, and this parametron is coupled with a load winding 52 having a D.C. control winding. When a direct current is applied to the terminal 17' of a control winding, the inductance of said winding is decreased and said parametron becomes unable to oscillate, and when the direct current on said terminal 17' is interrupted, the load inductance becomes increased and the parametron comes to a condition able to oscillate. But in this case, the parametron is adjusted to generate an oscillation of three value. In the example of other oscillation control means, a current flowing through the D.C. bias windings 51 provided upon the magnetic cores 1 and 2 can be controlled by signals.

In the device of FIG. 20 a parametron 50 is employed as stated above, and when the signal is to be written in, a write-in signal is applied to the terminal 17' whereby this parametron is brought into a condition of three value oscillation. Therefore, the parametron 50 oscillates only when an information signal is applied to the input terminal 15, and as the oscillation output of parametron 50 is supplied to the parametron 13', this parametron 13' begins to oscillate to write the signal into the delay line 12. But when an information signal is not applied to the terminal 15, the parametron 50 cannot oscillate, and therefore the parametron 13' can only generate an oscillation when a signal is applied from the delay line, and said signal is applied to the delay line after being regenerated and amplified. Therefore when the device of FIG. 20 is used, control of switching simultaneously with the information signal by the use of the device of FIG. 12 is not necessitated, so that the use of the device of FIG. 20 is extremely advantageous in the case when the period of input signal is not coincided with the period of exciting waves. When an uncontinuous excitation wave is used, any usual parametron of two value can be used as a parametron 50 of the device of FIG. 20. That is to say, a parametron 53 of two value can be coupled to a parametron 13 and to an uncontinuous exciting wave from a terminal 17'', as shown in FIG. 22. In this case, if write-in signal into the delay line is necessitated, an exciting wave is applied to a parametron 53 only when the signal is applied to the terminal 15. And in order to maintain the signal, the exciting wave is not impressed to the terminal 17'' and this parametron 53 is maintained at a position not to oscillate.

Since many changes could be made in the above construction and many apparently wide different embodiments of this invention could be made without departing from the scope thereof, it is intended that all matter contained in the above description or shown in the accompanying drawings shall be interpreted as illustrative and not in a limiting sense.

What is claimed is:

1. A signal delay device comprising non-linear reactance core elements, an electro-acoustic transducer and a metallic wire, each of said core elements having a primary winding and a secondary winding, the secondary windings of said core elements being connected with the transducer and with each other in series and in the same relation, said electro-acoustic transducer being connected to an intermediate portion of said metallic wire, said primary windings being connected with each other in series and in opposition relation to each other, said primary windings being adapted to receive an exciting wave, the resonance frequency of said secondary windings, said metallic wire and said electro-acoustic transducer being two times the freqeuncy of the exciting wave, said metallic wire including polished ends.

2. A signal delay device comprising non-linear reactance core elements, an electro-acoustic transducer and a fine metallic wire operatively coupled to said transducer, each of said core elements having a primary winding and a secondary winding, the secondary windings of said core elements being serially connected with each other in the same relation and having an output, said transducer being connected across said output of said secondary windings to couple said metallic wire in circuit therewith, said primary windings being connected with each other in series and in opposite relation to each other and having an input, said primary windings receive an exciting wave at said input for energizing said secondary windings, the resonant frequency of said secondary windings, said transducer and said metallic wire being substantially twice the frequency of the exciting wave.

3. A signal delay device as claimed in claim 2 in which the electro-acoustic transducer is coupled to both ends of said metallic wire, one of which acts to provide an input for a signal and the other providing the output for the signal.

4. A signal delay device as claimed in claim 2 in which the metallic wire is of copper alloy.

5. A signal delay device as claimed in claim 2 in which a diameter of the metallic wire is small.

6. A signal delay device as claimed in claim 2 in which the diameter of the metallic wire is less than 1.5 millimeters.

7. A signal delay device as claimed in claim 2 comprising clips at a plurality of points along said wire for supporting the same.

8. A signal delay device as claimed in claim 2 in which the electro-acoustic transducer is a piezo electric element.

9. A signal delay device as claimed in claim 1 in which the electro-acoustic transducer is a piezo electric element.

10. A signal delay device as claimed in claim 2 in which the electro-acoustic transducer is a condenser of barium titanate.

11. A signal delay device as claimed in claim 1 in which the electro-acoustic transducer is of barium titanate.

12. A signal delay device comprising a resonance circuit including non-linear reactance core elements and primary and secondary windings on said core elements, at least one electro-acoustic transducer coupled to the secondary winding, and a metallic wire connected to said transducer; the resonance circuit including an output the signals of which are applied to the input of the resonance circuit whereby regeneration and amplification of the signals are obtained, the signal being fed via said transducer to said metallic wire to record the same.

13. A signal delay device comprising non-linear reactance core elements, a condenser including an electro-acoustic transducer and a fine metallic wire formed of a copper alloy operatively associated with said transducer to form one plate of said condenser, each of said core elements having a primary winding and a secondary winding, the secondary windings of said core elements being serially connected with each other in the same relation and having an output, said condenser being connected across said output of said secondary windings to couple said metallic wire and said transducer in circuit therewith, said primary windings being connected with each other in series and in opposite relation to each other and having an input, said primary windings receive an exciting wave at said input for energizing said secondary windings, the resonant frequency of said secondary windings, said transducer and said metallic wire being substantially twice the frequency of the exciting wave.

14. In a signal delay device for parametrically excited resonator system, resonators each comprising non-linear reactance core elements having coupled thereto primary and secondary windings, and a condenser formed of high dielectric material operatively associated to all but one of the resonators, said secondary windings of each of said core elements being serially connected with each other in the same relation, said primary windings being connected with each other in series and in opposite relation to each other, an electro-acoustic transducer coupled in one of said resonators in place of said condenser in the other resonators and a fine metallic wire, one end of said wire being coupled to said transducer and the other end of said wire is free, so that an input oscillation wave to said transducer due to a binary phase input signal train from one of said resonators is transformed into a mechanical vibration by said transducer and impressed upon said wire, whereby said mechanical vibration of said wire is transmitted to said wire and transformed into an A.C. wave in order to control the output phase of the resonator system.

15. The signal delay device according to claim 14, in which at least one of said resonators constitutes an input and output resonator, said transducer being coupled to said last-mentioned resonator.

16. A signal delay device according to claim 14, in which the output of said one resonator is coupled to and controls the input of said one resonator in order to regenerate and amplify signals in said one resonator while said signal is repeatedly impressed upon the metallic wire to record the signal.

17. A signal delay device according to claim 15, in which one of said resonators acts to regenerate the signal and impress the same on said metallic line repeatedly to record the signal.

18. A device according to claim 17, including means to switch over a write-in action and a maintaining action for the signal.

19. A device according to claim 18 in which at least two others of said resonators are coupled to the input end of said one resonator coupled to said transducer and said metallic wire, and the oscillating phase of said one resonator is controlled by impressing an information signal upon said two others of said resonators when the signal is written-in and by impressing a signal having an inversed phase upon said two others of said resonators when the signal is retained.

20. A device according to claim 17, including means to impress a control signal and an exciting wave on each said resonators to oscillate same.

21. A delay device according to claim 14, in which the acoustic transducer is a magneto-strictive device.

References Cited in the file of this patent

UNITED STATES PATENTS

| | | |
|---|---|---|
| 2,711,515 | Mason | June 21, 1955 |
| 2,731,203 | Miles | Jan. 17, 1956 |
| 2,806,155 | Rotkin | Sept. 10, 1957 |